United States Patent Office 2,764,786
Patented Oct. 2, 1956

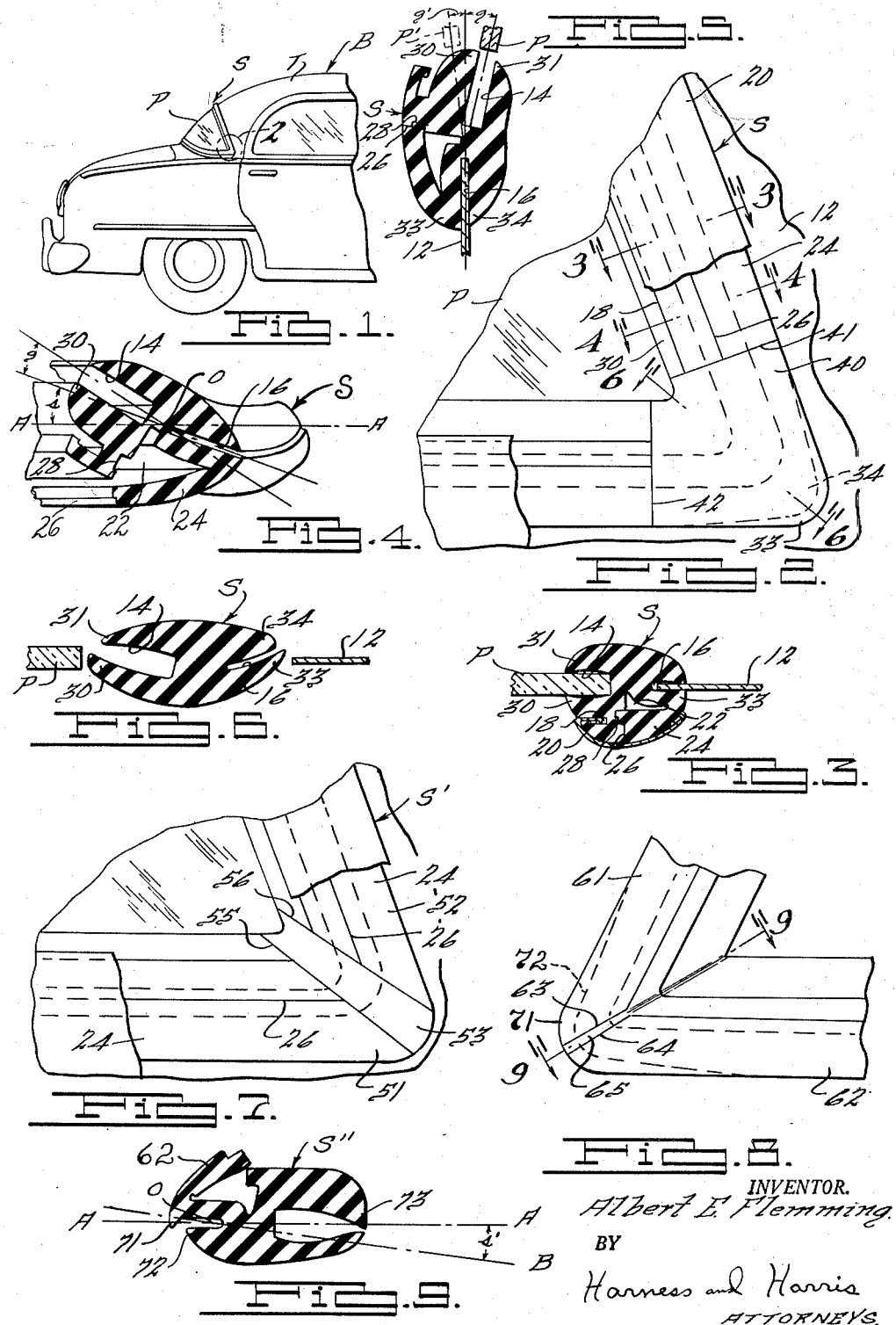

2,764,786

SEALING STRIP

Albert E. Flemming, Birmingham, Mich., assignor to Chrysler Corporation, Highland Park, Mich., a corporation of Delaware Application February 27, 1953, Serial No. 339,411

4 Claims. (Cl. 20—56.4)

This invention relates to deformable mounting strips of rubber or rubber-like material which are adapted to form a weatherproof joint between the periphery of a glass or other type of panel and the support upon which the panel is mounted.

The mounting strip of this invention is particularly useful for resiliently mounting and cushioning the glass windshield and/or the glass rear window of an automobile body upon the adjacent supporting portions of the associated body structure.

It is a primary object of this invention to provide a resilient, weather sealing, mounting strip having certain portions of its length that are rotated, relative to other portions thereof, about the longitudinal axis of the strip. By such a construction the rotated portions of the strip provide interference portions that are twisted into tight sealing engagement with the edge portions of the associated panel when the panel is mounted in the panel receiving groove of the sealing strip. As a result of this invention, a relatively simple, inexpensive, modification of conventional sealing strips permits the strips to develop increased sealing pressure along those areas where leakage is most likely to occur such as at panel corners or turns or in areas where the panel has a reverse curvature.

It is another object of this invention to provide a yieldable panel mounting strip wherein the panel receiving groove thereof is rotated a predetermined amount with respect to the strip pinchweld or body mounting slot so that an effective pressure seal will be developed between the panel and the strip panel engaging lip portions regardless of the angle of approach of the panel with respect to the body mounting slot.

It is still another object of this invention to provide a mounting strip for glass panels or the like that is adapted to surround the panel and support it in a manner that cushions it against shock, said mounting strip also providing a weatherproof seal about the periphery of the panel even though the panel may approach the mounting strip at varying angles and/or the curvature of the panel may change from place to place throughout its area.

It is a further object of this invention to provide a sealing strip with the panel receiving slot thereof disposed at an angle to the slot receiving the strip supporting member so that a weatherproof seal will result regardless of the angle of approach of the panel member with respect to the supporting member.

It is still another object of this invention to provide the sealing strips with portions thereof rotated about the strip longitudinal axis so that built-in strip interference will insure a weatherproof seal along all portions of the seal.

Other objects and advantages of this invention will be readily apparent from a reading of the following description thereof and a consideration of the related drawings, wherein:

Fig. 1 is a fragmentary side elevational view of the rear end portion of an automobile body;

Fig. 2 is an enlarged fragmentary side elevational view of that portion of the vehicle body that is included within the circle 2 of Fig. 1, certain portions of the trim moulding associated with the window seal element being broken away for the sake of clarity;

Fig. 3 is a sectional elevational view taken along the line 3—3 of Fig. 2;

Fig. 4 is a sectional elevational view taken along the line 4—4 of Fig. 2, but showing the normal position of the sealing strip prior to engagement of the sealing strip with the window panel and the associated body flange;

Fig. 5 is a sectional elevational view of a mounting strip similar to the strip shown in Figs. 1–4 but having the panel receiving slot thereof extending at an angle to the body receiving slot;

Fig. 6 is a sectional elevational view taken along the line 6—6 of Fig. 2;

Fig. 7 is a fragmentary side elevational view, similar to Fig. 2, of another form of the invention, certain portions of the associated moulding strip being broken away for the sake of clarity;

Fig. 8 is a fragmentary side elevational view of still another form of pressure sealing panel mounting strip; and Fig. 9 is a sectional elevational view taken along the line 9—9 of Fig. 8.

Fig. 1 of the drawings shows, in side elevation, the rear portion of an automobile body B. As is customary, the body B has a transparent window panel P extending across the upper portion of its rear end. In an effort to blend the window panel P into the curvature of the rear portion of the vehicle body top T, it has become general practice to use curved rear window panels that may have several different curvatures throughout their area. While the varying panel curvatures add to the appearance of the vehicle window or windshield, still, they present serious problems as regards weatherproof sealing about the panel peripheries. The inventions herein disclosed set forth improved means for satisfactorily sealing the peripheries of curved panels and for sealing the edges of panels that engage the sealing strips at odd or varying angles with respect to the slot in the strip that receives the associated vehicle body flange or fence portion.

Fig. 3 shows a preferred form of panel mounting strip S installed between the glass panel P and the flange-like fence portion 12 of the vehicle body B. The mounting strip S is substantially oval shaped in cross sectional configuration and has a pair of opposed slots or channels, 14 and 16 respectively, that extend longitudinally of the strip S along the sides thereof. Slot 14 is adapted to receive the edge portion of the glass panel P while slot 16 receives the panel supporting, flange-like, fence portion 12 that extends about the periphery of the panel receiving opening in the body B. Extending longitudinally of the strip S, beneath the panel receiving slot 14 is a relatively narrow slot or slit 18 that is adapted to receive the anchoring edge of a trim moulding strip 20. Moulding strip 20 may be metallic or plastic and is adapted to substantially cover the exposed outer side (lower side in Fig. 3) of the strip S when it has been finally installed. Strip S is also formed with a longitudinally extending channel-like portion 22 at substantially the transverse center thereof. The sides of the channel-like portion 22 are shaped to provide the hinged locking flange or lip 24 along the outer (lower side in Fig. 3) side of the strip S. The free end 26 of the locking lip 24 is of stepped formation and is adapted to be forced into locking engagement with a matingly shaped stepped portion 28 that constitutes a wall portion of channel-like formation 22. When the lip portions 26, 28 are lockingly engaged the lip 24 exerts a force on the portions of the strip 30 and 33, forming walls of the slots 14, 16 respectively, that tends to close said slots 14, 16 so as to produce a good seal at the slots 14, 16.

Fig. 4 shows strip S prior to mounting of the body flange 12 in the strip slot 16 and before seating of the periphery of the glass panel P in the strip slot 14. It will be noted that the locking lip 24 extends below and does not have its stepped free end 26 engaged with the mating stepped formation 28 at this time. After mounting of the slot 16 of strip S on the body fence portion 12, the glass panel P then has its edge portions seated in the strip slot 14. Thereafter the lip edge 26 is forced inwardly to lock with the formation 28 and anchor the assembled parts in position.

In the process of mounting the glass panel P in the strip slot 14 the portions 30 of the strip S interfere with the panel and the portions 30 of strip S will be twisted counterclockwise until the panel P and body fence portion 12 are aligned as shown in Fig. 3. In the process of twisting the strip S counterclockwise during the installation of the panel P, the pressure between the lip portion 30 of the strip S and the adjacent portion of the glass panel P is increased and this improves the seal between these pressure engaged portions.

A consideration of Fig. 4 will bring out that this portion of the strip length has been twisted or rotated about the strip longitudinally extending axis O through the angle s. In other words the untwisted portions of the strip S have their slots 14, 16 normally aligned with axis A—A so the twisted portions of the strip S must be rotated counterclockwise through an angle s during installation of the panel P in order to become aligned with the other portions of the strip. It is thought to be obvious that if certain regions along a seal strip are so positioned that they are more likely to produce a poor seal than other regions along the seal strip, then it is merely necessary to properly rotate those portions of the seal that are more likely to leak and thereby build a certain amount of interference into the strip so that a leakproof seal will be assured. It has been found to be particularly helpful to rotate those portions of a sealing strip that are located at the lower corners of a vehicle windshield or rear window, particularly if curved window glass is used for the panel material.

Not only has the end portions of the strip S that is shown in Figs. 2 and 4 been rotated through the angle s, but in addition the glass receiving slot 14 thereof is located so that it normally extends at an angle g with respect to the transverse axis A—A of the strip. In Fig. 4 is shown the effect of the combination of the strip rotation and the positioning of the glass receiving slot 14 at the angle g with respect to the axis A—A. Fig. 5 shows a portion of the strip S spaced from the end portion that has not been rotated. In this instance the angularity of the panel receiving slot 14 with respect to the strip transverse axis A—A is quite apparent. This angularity of the panel receiving slot 14 with respect to the body flange receiving slot 16 is designed to take care of variations in the curvature of the panel at different points throughout the area of the panel. It has been found that in certain rear window and windshield installations the curvature of the window panel actually reverses itself at different points therein. Such a reversal of panel curvature produces a difficult sealing problem with the conventional sealing strip that has its panel receiving slot and its body flange receiving slot aligned in the same transverse plane. As the angle of approach of the panel P with respect to the flange 12 varies, the seal between the panel P and the sealing strip lip 30 will be either improved or destroyed depending on whether the pressure of the lip 30 against the panel side surface is increased or decreased. The construction shown in Fig. 5 is designed to provide a weatherproof seal in substantially any condition that might be encountered with present day windshield and rear window assemblies or constructions resembling same.

Considering Fig. 2, it will be noted that the corner portion 40 of the sealing strip S is formed by inserting an injection molded section in the portion of the strip between the two lines 41 and 42. The portions of the strip adjacent the section 40 can be formed by extrusion processes if desired and their ends 41, 42 are normal to the longitudinal center line of the strip. Corner sealing portion 40 is of arrow-shaped plan configuration.

Considering Fig. 5, if the angle of approach g of the glass is anything smaller than the angle g then obviously a good seal will result due to the fact that installation of the panel P in the panel receiving slot 14 of the seal S will increase the pressure between the seal lip 30 and the outer side of the panel P. The fact that the seal lip 31 may pull away from the inner side of the panel P is of no consequence for the inner side of the panel is not exposed to the weather and furthermore it is usually hidden from view. If the curvature of the panel P is such as to make the panel angle of approach g' similar to that shown by the panel P' in Fig. 5 then again an improved seal is obtained between the seal lip 30 and the outer side of the panel P' due to the increase in pressure between these elements during panel installation. This angularity of the panel receiving slot 14 of strip S with respect to the location of the body receiving slot 16 in said strip S is the second improved feature of this invention and it can be used either separately or in combination with the rotation of sections of the strip S about its longitudinal axis O.

Fig. 6 shows a section across the corner intersection of the strip S at the location indicated by line 6—6 in Fig. 2. However, this view shows the strip shape prior to mounting of the strip on the body fence 12 in the slot 16 and before mounting of the panel P in the strip panel receiving slot 14. It will be noted that the corner portion of the strip S is formed with a concavo-convex curvature such that as the strip S is mounted on the fence 12 and engaged with panel P the strip curvature will be straightened out so as to increase the sealing pressure between the lip portion 30 and the outer side of the panel P and to also increase the pressure between the lip portion 33 and the body fence portion 12. It will also be noted that the lip portion 33 is enlarged so that it overhangs the lip portion 34 and thus insures a weatherproof seal at the corner portion.

Fig. 7 shows a modified form of the invention shown in Fig. 2 wherein the extruded strip sections 51 and 52 of the strip S' have a wedge shaped injection moulded section 53 formed between the section 51 and 52. It will be noted that the ends 55 and 56, of the sections 51 and 52 respectively, extend across the sections 51, 52 at an angle rather than normal to the length of the strip sections as was the case for the ends 41 and 42 of the strip sections of the strip S shown in Fig. 2. The Fig. 7 construction permits the slit 26 for the locking lip 24 to be carried into the corner section and thus tends to give a better corner seal than the construction shown in Fig. 2. All other features of the strip S shown in Fig. 2 are included in the strip S' shown in Fig. 7 so additional description of the Fig. 7 form of the invention is considered unnecessary. Similar parts of the Fig. 2 and Fig. 7 forms of the invention carry the same reference numerals.

Figs. 8 and 9 show a third form of the invention wherein the hinged locking lips 61 and 62 of the intersecting sections of the strip S'' have their ends, 63 and 64 respectively, carried into the very corner of the strip. The section ends 63 and 64 are cut off so that there is a small clearance space 65 therebetween to prevent interference between the ends of the locking lips 61, 62 when these lips are pressed into locking engagement. The body flange engaging lips 71 and 72 respectively are arranged so that the outer lip 71 overhangs the inner lip 72 in the same manner as the lips 33, 34 of the Fig. 2 form of the invention. It will also be noted from Fig. 9 that the strip sections adjacent the corner are rotated about the longitudinally extending axis O by an amount equal to the angle $s'$. This rotation of the strip sections adjacent their ends builds in interference in this region to improve the pressure seal between the outer panel sealing lip 73 and the panel element engageable therewith.

I claim:

1. A seal corner section comprising a pair of sealing strip end portions arranged in spaced angular relationship, each sealing strip being formed of a strip of resilient material of uniform cross sectional configuration that has first and second longitudinally extending slots formed therein that are arranged to extend along opposed sides of the strip, the plane of the first slot in said strip being arranged at an angle with respect to the plane of the second slot in said strip, and a corner sealing portion connecting the spaced adjacent ends of said pair of sealing strips having slots therein forming continuations of and connecting the said first and second slots in said spaced sealing strips, said corner sealing portion having a normally concavo-convex cross sectional configuration.

2. A seal corner section as set forth in claim 1 wherein the corner sealing portion is of arrowhead-shaped plan configuration and the connection of the corner sealing portion to each of the sealing strip end portions is along lines normal to the length of the strip.

3. A seal corner section as set forth in claim 1 wherein the corner sealing section is of wedge-shaped plan configuration and the connection of the corner sealing portion to the ends of the sealing strip end portions is along lines extending angularly across the strip end portions adjacent the plane of intersection therebetween.

4. A seal corner section as set forth in claim 1 wherein the side walls of one of said slots are of unequal length so as to provide a lip portion on one side of said one slot that overhangs the lip portion on the other side of said one slot.

References Cited in the file of this patent

UNITED STATES PATENTS

| | | |
|---|---|---|
| 2,288,329 | Smith | June 30, 1942 |
| 2,350,430 | Ulrich | June 6, 1944 |
| 2,505,893 | Haas | May 2, 1950 |
| 2,623,250 | Chilton | Dec. 30, 1952 |